Feb. 27, 1923.

E. C. CLARK.
SUN AND RAIN SHIELD FOR AUTOMOBILE TOPS.
FILED OCT. 4, 1920.

INVENTOR.
Ernest C. Clark
BY
ATTORNEY.

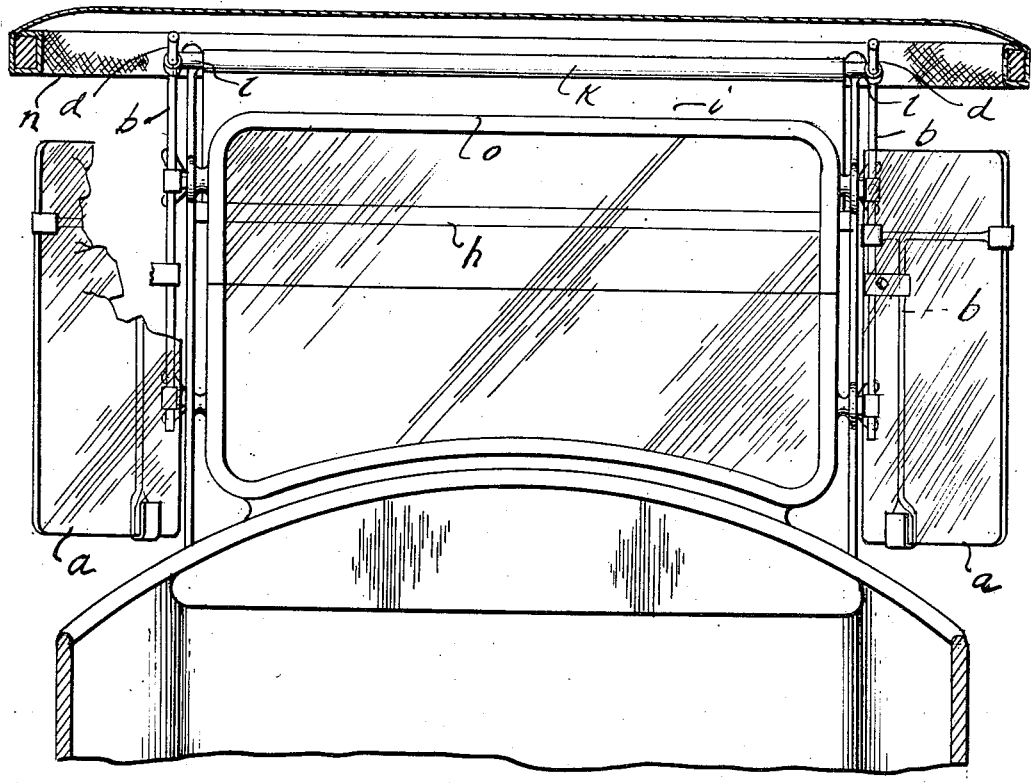
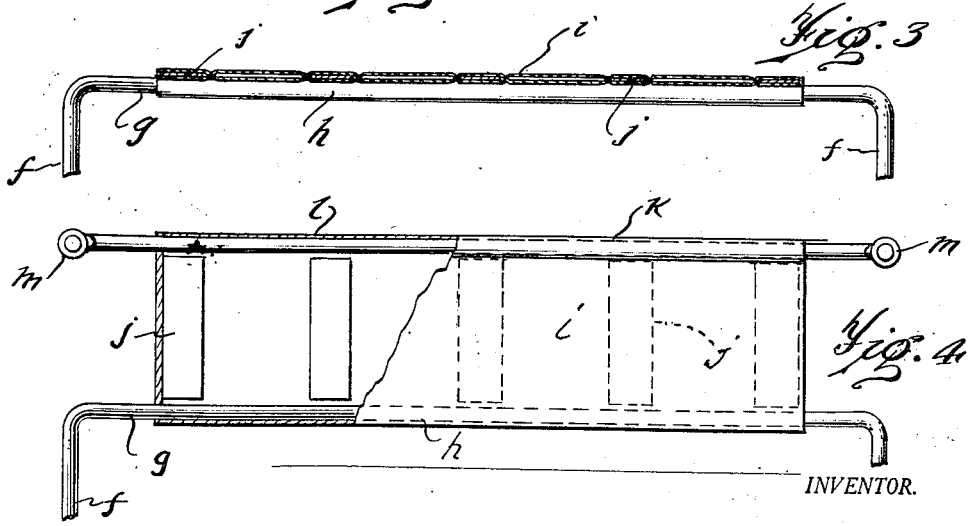

Patented Feb. 27, 1923.

1,447,062

UNITED STATES PATENT OFFICE.

ERNEST C. CLARK, OF JACKSON, MICHIGAN.

SUN AND RAIN SHIELD FOR AUTOMOBILE TOPS.

Application filed October 4, 1920. Serial No. 414,465.

*To all whom it may concern:*

Be it known that I, ERNEST C. CLARK, a citizen of the United States, residing at Jackson, in the county of Jackson and State of Michigan, have invented certain new and useful Improvements in Sun and Rain Shields for Automobile Tops, of which the following is a specification.

This invention relates to a sun and rain shield or awning for an automobile top. It has for its object an awning which is simple and cheap to manufacture and which can be stowed away under the top when not in use, thus avoiding the objectionable appearance of such a device. Furthermore, the awning acts as a weather-seal to prevent the wind or rain from coming in between the top and the top of the windshield. These and other features will appear in the description following.

In the drawings,—

Fig. 2 is a view from the inside of the car looking forward through the windshield.

Fig. 3 is a cross section on the line 3—3 of Fig. 1.

Fig. 4 is a front view of the sun and rain shield detached from the automobile top.

Figures 1, 5:
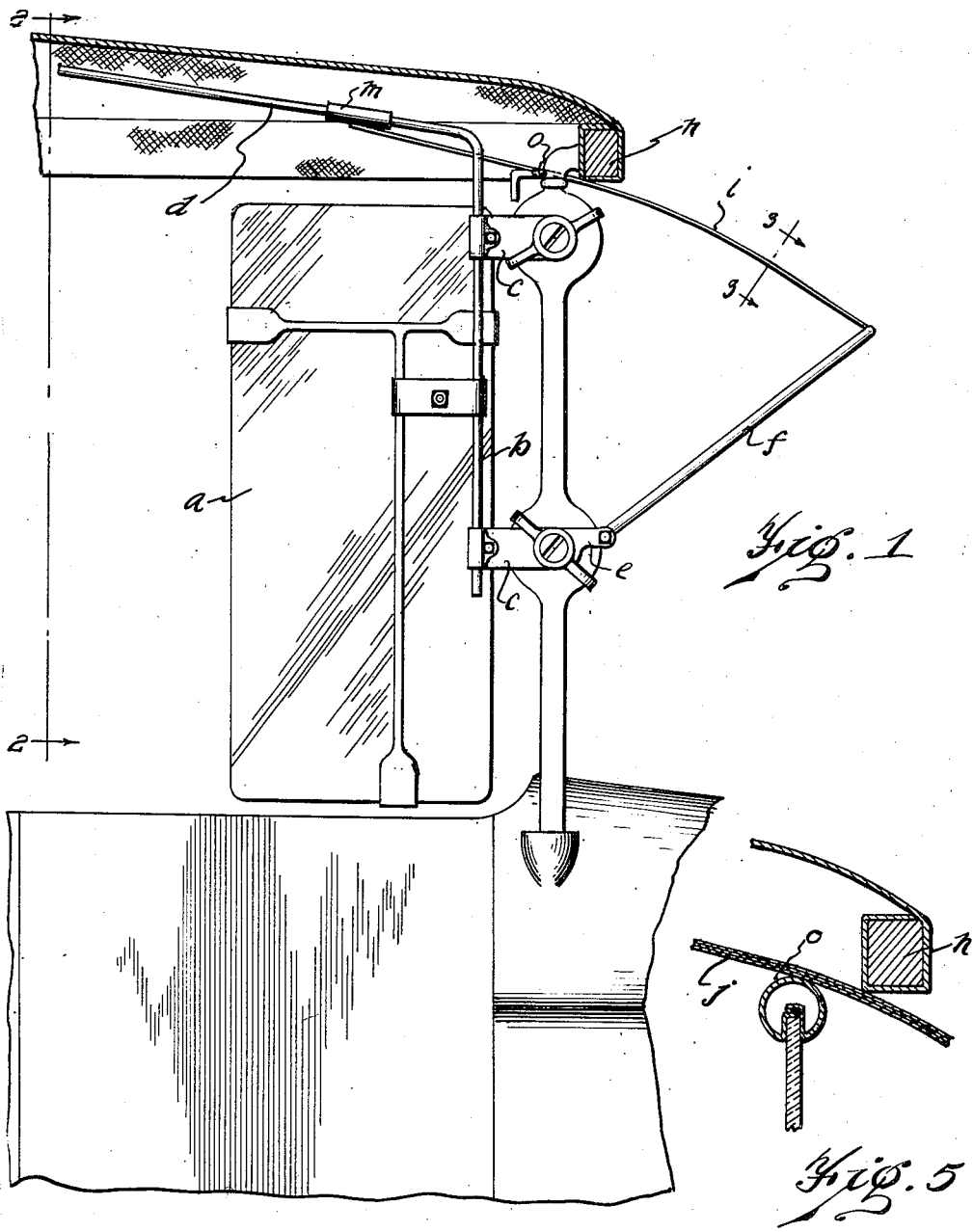
Fig. 1 is a fragmentary side elevation of an automobile showing a top in longitudinal section and showing a side view of my sun and rain shield.
Fig. 5 is a sectional detail showing the weather seal between the windshield top and front bow.

Various forms of sunshades and awnings have been proposed for automobiles and are now in use. A great majority of those with which are familiar are in the form of a flat glass shield, formerly known as the rain vision shield. Others are in the form of a flat shield made out of some kind of top material, but most of these are either carried in a partially inclined position in which they act as a sunshade or rain shield or else when not being used for this purpose they have to be raised to a substantially horizontal position. They swing on a single pivot or are stationary and consequently they are always projecting forward of the car whether in actual use or in non-use.

It is the object of the present invention to provide a disappearing sun and rain shield which not only is drawn back from an unsightly projecting position but also acts as a weather-seal between the front bow and the top of the windshield.

*a* designates a glass wind deflector now used quite commonly at the sides of windshields. It is customary to support such wings upon a post *b* which is secured to the windshield post by arms *c*, *c* that engage over the windshield pivots. This post *b* may be provided with an extension or elbow *d* adapted to act as a guide arm for my improved shield or awning. The sun or rain shield frame is supported upon lugs *e* projecting from the lower windshield pivot on the windshield post. These lugs *e* may be a continuation of the lower arm *c*. However, the detail of this construction is immaterial. These lugs *e* pivotally support the frame *f* which comprises simply a pair of arms with a connecting run at the front designated *g* which runs through a pocket *h* forming the front of the web *i*. This web *i* is formed of two thicknesses of fabric or preferably top material and into this is sewed brass strips *j* here shown as five in number.

This web extends back and a pocket *k* is formed at the back of the web to engage the cross bar *l* that connects a pair of guide sleeves *m* which run on the rod *d*. These guide sleeves *m* do not run freely on the rod *d* for the reason that both the swinging of the awning upon its arc of travel and the position of the bow *n* tend to flex the springs *j* (see Fig. 5) and hence cause the sleeves *m* to bind upon their guides. This binding action may be easily overcome by the use of the hands to lower the awning but is sufficient to hold the awning in any position desired. It will be obvious that this is a very useful action in this connection as it does away with any necessity of fastening the awning in any given position by any adjustable means, although fasteners may very easily be provided and come within my broad invention.

The spring brass strips have a peculiar function in connection with the weather-sealing feature (see Fig. 5). The awning passes under the front bow *n* and over the top of the windshield designated *o*. The position of the guide arms *d*, the top of the windshield and the front bow is such that at all times the web is distorted and rubs the under side of the bow and the top of the windshield. This it will readily be understood can be accomplished by the proper location of the guide arms *d* and the top of the windshield and the bottom of the front bow. Broadly considered, this feature consists in passing a stiff elastic web between three points not in a straight line. The bow and windshield top might be arranged with reference to the swinging end of the awning to effect the same object.

This affords a very useful construction at the front of the car. It takes the place of what is now known as a vizor construction, namely, a piece of horizontal fabric sewed to the bottom of the front bow to which is attached a downwardly depending wind flap to engage the front of the top of the windshield. With my invention such a construction is not now necessary.

It will readily be understood, of course, that the wind deflector *a* is not essential to my invention. The guide arms *d* might be in some other way attached other than by a continuation of the wind deflector post *b*. However, the wind deflector post forms a very suitable support for the guide arms.

What I claim is:

1. The combination with a vehicle top and a windshield, of a sun and rain shield, comprising a frame pivoted to the windshield, and a flexible web secured at its lower edge to said frame and provided with suitable stiffeners and which withdraws flatwise between the windshield top and the vehicle top to a position under the vehicle top.

2. The combination with a vehicle top and a windshield, of a sun and rain shield, comprising a frame pivoted at the front of the windshield, and a stiffened web secured at its lower edge to said frame and that withdraws flatwise under the vehicle top between the windshield top and the front bow and which engages the vehicle top and the top of the windshield to form a weather-seal.

3. The combination with a vehicle top and a windshield, of an awning or sun and rain shield, comprising a frame pivotally supported at its lower end, and a flexible web provided with stiffening means and fastened at the lower end to the said frame and which withdraws flatwise when not in use under the vehicle top between the vehicle top and the top of the windshield, being distorted therebetween.

4. The combination with a vehicle top and a windshield, of a sun and rain shield or awning, comprising a supporting frame, a flexible web provided with spring stiffening strips secured at its lower end to the said frame and which may be withdrawn flatwise under the vehicle top between the vehicle top and the top of the windshield, and guides suspended under the vehicle top for supporting and guiding the rear or upper end of the web.

5. The combination with a vehicle top and a windshield, of a sun and rain shield or awning, comprising a frame pivotally supported at its lower end, a stiffened fabric web supported at its lower end on the said frame, and a guide and support for the upper end of the web, said web running between the front bow and the windshield top and withdrawable flatwise under the vehicle top when not in use.

6. The combination with a vehicle top and a windshield, of a sun and rain shield or awning, comprising one or more guide arms supported under the vehicle top, a bar support provided with one or more guide sleeves engaging the guide arm or arms, a frame, and a web supported at its front on the said frame and at its rear on the said cross bar and traveling between the front bow and the top of the windshield when moving from a position of use to a position of flatwise storage, or vice versa.

7. The combination with a vehicle top and a windshield, of a sun and rain shield or awning, comprising a pair of guide arms supported on the under side of the top, a pair of guide sleeves running on said guide arms, a cross bar connecting the guide sleeves, a frame pivotally supported, and a web supported at the front end to said frame and at its rear end on the said cross bar, the said web traveling between the bottom of the front bow and the top of the windshield from a position of use to a position of storage, and vice versa.

8. The combination with a windshield and a vehicle top, of a sun and rain shield or awning, comprising a pair of guide arms supported under the vehicle top, a pair of guide sleeves slidable thereon, a cross bar connecting the guide sleeves, a frame pivotally supported in front of the windshield, and a stiffened web supported at the front on the said frame and at the rear on the cross bar and passing between the front bow and the top of the windshield, the distortion of the web in passing between the top of the windshield and the front bow serving to bind the sleeves upon the guide arms to hold them in place.

9. The combination with a vehicle top and a windshield, of a sun and rain shield or awning, comprising a pair of guide arms supported under the vehicle top, a pair of sleeves slidable thereon, a cross bar connecting the same, and a spring stiffened awning supported at the front and connected with the cross bar at the rear and passing between the front bow and the top of the windshield in distorted relation to afford a wind seal at this point.

10. The combination with a vehicle top and a windshield, of wind deflector posts secured to the windshield, wind deflectors carried on the posts, extensions of the wind deflector posts forming guides located under the top, a frame pivotally supported at the front of the windshield, and a web supported at the front on the frame and running between the bow and the top of the windshield and secured to a plurality of sleeves that run on the guide arms, and the said sleeves.

11. The combination with a vehicle top and a windshield, of a sun and rain shield comprising a web that is flexible but provided with reinforcing stiffeners, a pivoted frame attached to the front of the web for guiding the front of the web on an arc and a guide for constraining the rear of the web to take a substantially straight path, the said web being movable between the top of the windshield and the vehicle top from a a position of flat storage to an angular position in front of the windshield and conversely.

12. The combination with a vehicle top and a windshield, of a sun and rain shield comprising a flat web supported at its lower or forward end to swing on an arc and passing between the top of the windshield and the vehicle top and having its rear edge guided substantially parallel with the under side of the top in a substantially straight path to a position of storage flatwise under the vehicle top when the front end of the web is swung up.

13. The combination with a vehicle top and a windshield, of a sun and rain shield comprising a flat web, a pivoted frame for guiding the front of said web to swing on an arc, and guide means supported under the top to guide the rear of the web to travel in a substantially straight path substantially parallel with the under side of the top to store the web flatwise under the top when the web is swung up at the front and between the top of the windshield and the vehicle top.

14. The combination with the observation window of a vehicle, of two arms pivotally attached one on each side of said window, a shield of fabric, substantially rigid material reinforcing said fabric to hold it flat, the substantially rigid shield attached at its lower edge to said arms, said shield being freely movable transversely across the top of said window, and means adapted to secure said shield in selected position.

15. The combination with the observation window of a vehicle, of two arms pivotally attached one on each side of said window, a frame-member connecting the free ends of said arms, a shield freely movable across the top of said window, said shield comprising a sheet of fabric folded to include said member and a sheet of substantially rigid material held between the folds of said sheet, said fabric being sewed to retain the parts thus included in proper place, and means adapted to secure said shield in selected position.

In testimony whereof I affix my signature.

ERNEST C. CLARK.